(12) United States Patent
Fukuda et al.

(10) Patent No.: US 7,390,592 B2
(45) Date of Patent: Jun. 24, 2008

(54) ELECTRODE PLATE UNIT AND BATTERY

(75) Inventors: Shinsuke Fukuda, Toyohashi (JP);
Naoto Arai, Ikeda (JP); Noriyuki Fujioka, Kosai (JP); Shinji Hamada, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 993 days.

(21) Appl. No.: 10/712,624

(22) Filed: Nov. 13, 2003

(65) Prior Publication Data

US 2004/0096738 A1    May 20, 2004

Related U.S. Application Data

(62) Division of application No. 09/842,562, filed on Apr. 25, 2001, now Pat. No. 6,680,146.

(30) Foreign Application Priority Data

Apr. 28, 2000  (JP)  ............................. 2000-131759

(51) Int. Cl.
   *H01M 2/26*   (2006.01)
(52) U.S. Cl. ........................ 429/152; 429/209
(58) Field of Classification Search .................. 429/94, 429/211, 121, 161, 152, 209
   See application file for complete search history.

(56) References Cited

U.S. PATENT DOCUMENTS

| 4,622,277 A | 11/1986 | Bedder et al. |
| 4,709,472 A | 12/1987 | Machida et al. |
| 5,368,961 A | 11/1994 | Juergens |
| 5,415,954 A | 5/1995 | Gauthier et al. |
| 6,193,765 B1 * | 2/2001 | Nakanishi et al. .......... 29/623.1 |
| 6,475,667 B1 | 11/2002 | Onishi et al. |
| 6,713,211 B2 * | 3/2004 | Morishita et al. ............. 429/94 |

FOREIGN PATENT DOCUMENTS

| EP | 0 570 590 | 11/1993 |
| EP | 0 690 520 | 1/1996 |
| JP | 3-152881 | 6/1991 |
| JP | 4-349369 | 12/1992 |
| JP | 10-106536 | 4/1998 |
| JP | 11-307128 | 11/1999 |

* cited by examiner

*Primary Examiner*—Mark Ruthkosky
(74) *Attorney, Agent, or Firm*—Hamre, Schumann, Mueller & Larson, P.C.

(57) ABSTRACT

An electrode plate unit capable of suppressing the internal short circuit caused by flashing that is formed on the end portion of a positive electrode plate and a battery using the same. The electrode plate unit includes a group of electrode plates in which a plurality of positive electrode plates and a plurality of negative electrode plates are laminated alternately via separators, a positive electrode collector plate connected to one side face of the group of electrode plates for connection to the positive electrode plate, and a negative electrode collector plate connected to another side face of the group of electrode plates for connection to the negative electrode plate, wherein the edge portion of the positive electrode plate is protruded from the edge portion of the negative electrode plate on the entire side face excluding the side face to which the negative electrode collector plate of the group of electrode plates is connected.

4 Claims, 14 Drawing Sheets

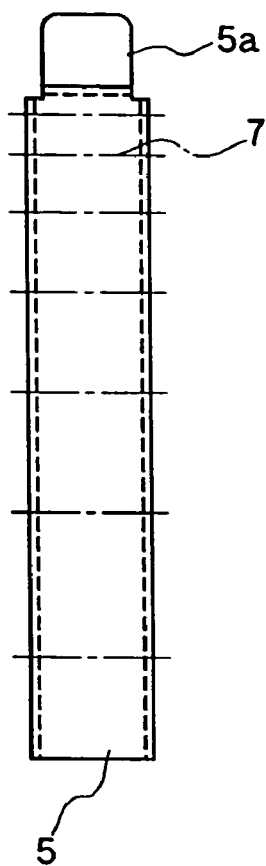
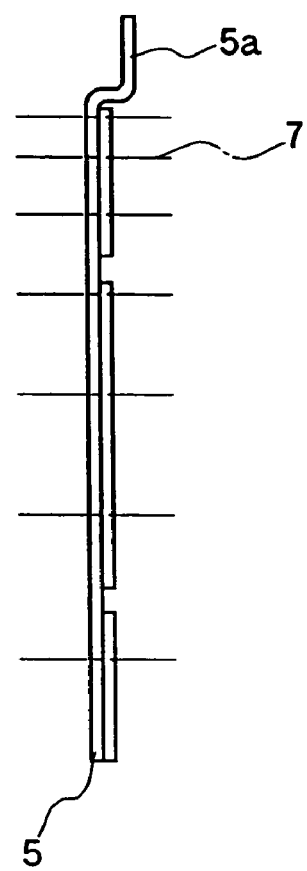
FIG. 7A  FIG. 7B
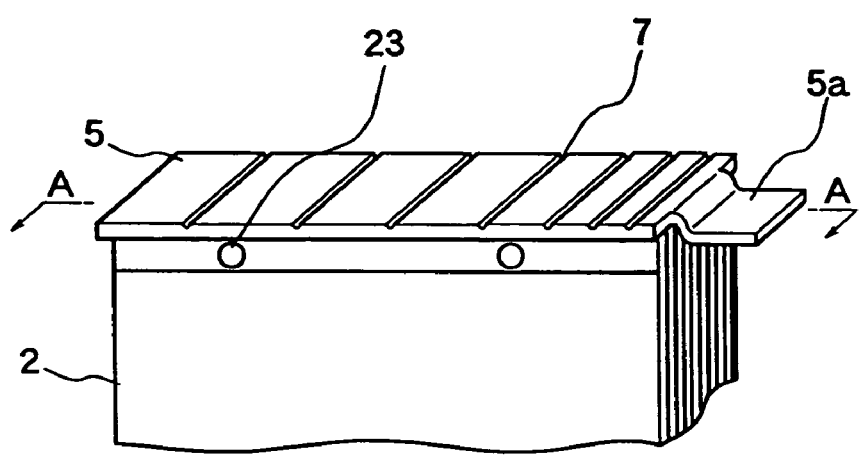
FIG. 8

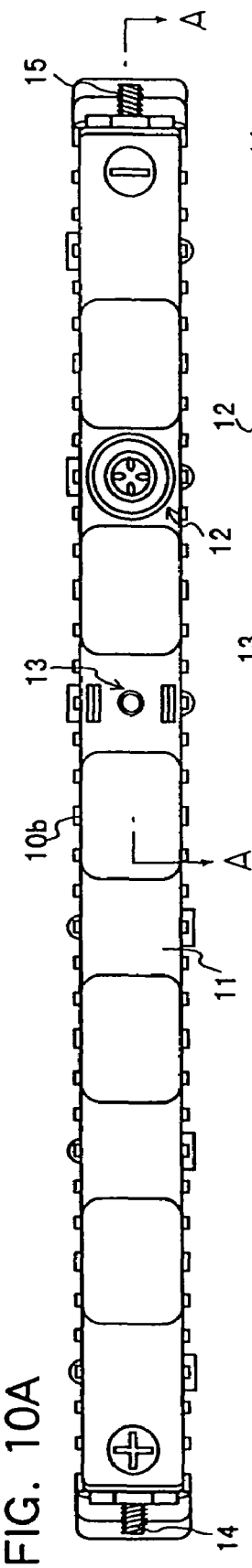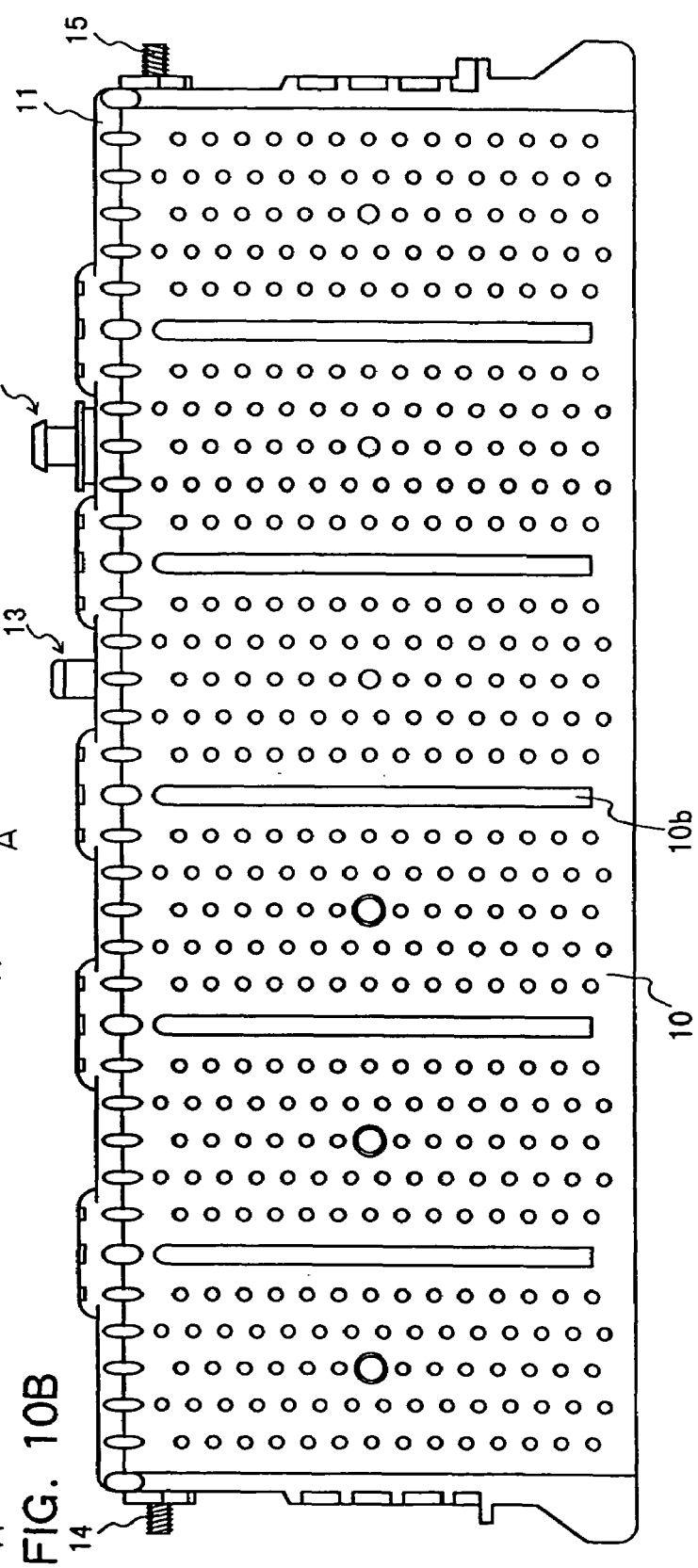
FIG. 10A
FIG. 10B

ELECTRODE PLATE UNIT AND BATTERY

BACKGROUND OF THE INVENTION

1. Field of the Invention

The present invention relates to an electrode plate unit and a battery using the same.

2. Description of the Prior Art

In recent years, secondary batteries are becoming used for various applications. In particular, the application as a driving source of an electric car is to be increased in the future under circumstances in which global environmental protection and effective use of energy resources increasingly have been demanded. With such a variation of applications, the further improvement of the battery property and reliability of a secondary battery have been required.

FIG. 14 shows a conventional secondary battery. In this structure, a battery case 51 housing a group of electrode plates 52 and electrolyte is closed by a lid 57 provided with a safety valve 56. As shown in FIG. 15, the group of electrode plates 52 has a structure in which a plurality of positive electrode plates 61 and a plurality of negative electrode plates 62 are laminated alternately via separators 63. The positive electrode plate 61 and the negative electrode plate 62 are formed by filling a substrate with an active material. As shown in FIG. 14, a lead 53 is led out of the positive electrode plate and connected to the positive electrode terminal 54 provided on the lid 57. Similarly, a lead is led out of the negative electrode plate and connected to the negative electrode terminal 55 provided on the lid 57.

Substrates forming each electrode are produced by cutting out a metal plate. Since a punched metal is used for a substrate for the negative electrode plate, little flashing is formed due to the cutting. On the other hand, when a foam metal is used for a substrate for the positive electrode plate, fibrous flashing is likely to be formed due to the cutting work. Therefore, as shown in FIG. 15, there has been a problem in that a flashing 61a that occurs on the end portion of the positive electrode plate 61 passes through the separator 63 and is brought into contact with the negative electrode 62, thereby causing an internal short circuit between the positive and negative electrodes.

Furthermore, in the above-mentioned conventional secondary battery, there is a problem in that since a side face of the group of electrode plates is exposed, when the group of electrode plates is inserted into the battery case for producing a battery, the electrode plate touches the wall surface of the battery case and may be damaged. One possible example of a structure of the secondary battery proposed in order to avoid such a problem is a structure in which an electrode plate unit in which a positive electrode collector plate is connected to one side of the group of electrode plates and a negative electrode collector plate is connected to another side of the group of electrode plates is housed in a battery case together with electrolyte, and the both electrode collector plates are connected to a positive electrode terminal and a negative electrode terminal, respectively. According to this electrode plate unit, since the side face of the group of electrode plates is covered with the collector plate, it is possible to reduce the damage to the electrode plate when the group of electrode plates is inserted into the battery case. In such an electrode plate unit, the group of electrode plates and the collector plate can be connected by welding. By providing the welding places in several places, it is possible to improve the connection strength and collecting efficiency. However, further improvement of the connecting strength between the group of electrode plates and the collector plate and the collecting efficiency are required.

SUMMARY OF THE INVENTION

It is a first object of the present invention to provide an electrode plate unit capable of suppressing the internal short circuit caused by flashing that is formed in the end portion of the positive electrode plate and a highly reliable battery using the same. Furthermore, it is a second object of the present invention to provide an electrode plate unit that improves the connecting strength between a group of electrode plates and a collector plate connected to the side face of the group of electrode plates and the collecting efficiency, and a highly reliable battery using the same.

A first electrode plate unit of the present invention includes a group of electrode plates in which a plurality of positive electrode plates and a plurality of negative electrode plates are laminated alternately via separators, a positive electrode collector plate being connected to one side face of the group of electrode plates for connection to the positive electrode plates, and a negative electrode collector plate being connected to another side face of the group of electrode plates for connection to the negative electrode plates, wherein the edge portion of the positive electrode plate is protruded from the edge portion of the negative electrode plate on the entire side face of the group of electrode plates excluding the side face to which the negative electrode collector plates are connected.

According to such an electrode plate unit, even if a flashing is formed on an edge of the positive electrode plate, the flashing is not brought into contact with the negative electrode. Therefore, it is possible to suppress the short circuit between the positive and negative electrodes due to the flashing on the positive electrode. Moreover, the "side face" in the group of electrode plates denotes a face parallel to the direction in which the electrode plates are laminated.

It is preferable in the first electrode plate unit that each of the positive electrode plate and the negative electrode plate has positioning holes formed on the edge portion of the side to which the positive electrode collector plate or the negative electrode collector plate is connected.

It is preferable in the first electrode plate unit that each of the positive electrode plate and the negative electrode plate has an electrode portion filled with an active material and a lead portion intervening between the electrode portion and the positive electrode collector plate or the negative electrode collector plate, and that the positioning holes are formed on the lead portion.

It is preferable in the first electrode plate unit that each of the positive electrode plate and the negative electrode plate is provided with a plurality of positioning holes, and at least one of the positioning holes has a circular shape and at least another positioning hole has an slot shape.

It is preferable in the first electrode plate unit that the positive electrode plate or the negative electrode plate is enveloped by the separator with the edge portion connected to the positive electrode collector plate or the negative electrode collector plate exposed. According to this preferable embodiment, short circuits between the positive electrode plate and the negative electrode plate can be suppressed more sufficiently.

In order to achieve the first object, a second electrode plate unit of the present invention includes a belt-like group of electrode plates in which a positive electrode plate and negative electrode plate that are laminated via a separator is rolled along the direction of the longer side, and the edge portion of the positive electrode plate protrudes from the edge portion of the negative electrode plate at least on a side face of the shorter side of the group of electrode plates. Here, a "the shorter side" corresponds to the side parallel to the axial direction of the battery.

Also with such an electrode plate unit, it is possible to suppress the short circuit between the positive electrode and the negative electrode.

In order to achieve the second object, a third electrode plate unit includes a group of electrode plates in which a plurality of positive electrode plates and a plurality of negative electrode plates are laminated alternately via separators, and a collector plate connected to one side face of the group of electrode plates by a plurality of welding portions, wherein the interval between welding portions in the connection portion between the collector plate and the group of electrode plates is set to be narrower in the region in which the density of electric current collected by the collector plate is higher.

When a collector plate is provided so as to cover the side face of the group of electrode plates, the variation in the collecting density in the collector plate tends to be increased. In the portion in which the collecting density is high, the connecting portion between the collector plate and the group of electrode plates is subjected to a great thermal stress, and the connection tends to be fractured. However, with the third electrode plate unit, since welding portions are provided with high density in the portion where the collecting density is high so that the connecting strength and the collecting efficiency are enhanced, it is possible to improve the reliability with respect to the collecting effect of the collector plate.

Moreover, the "collecting density" denotes a current running in a unit cross-sectional area of the collector plate. In a case where the collector plate is connected to the group of electrode plates so as to cover the entire surface of the side face of the group of electrode plates, in a region closer to the external terminal, the collecting density of the collector plate is higher.

The third electrode plate unit can have, for example, a structure in which the collector plate is disposed with one end portion protruded from the group of electrode plates, and the welding portion is formed so that the intervals between the welding portions are narrower in a region closer to the edge portion of the collector plate being protruded from the group of the electrode plates.

In the structure in which the end portion of the collector plate is protruded from the group of electrode plates, the end portion is allowed to function as a connecting portion for electrically connecting the collector plate to the other components of the battery (for example, an external terminal, etc.). In this case, the collecting density is increased in a region closer to the end portion of the collector plate. Therefore, in order to enhance the connection strength and the collecting efficiency, by providing the welding portions with a high density in the region closer to the end portion of the collector plate, it is possible to improve the connection reliability of the collector plate.

In order to achieve the second object, a fourth electrode plate unit includes a group of electrode plates in which a plurality of positive electrode plates and a plurality of negative electrode plates are laminated alternately via separators, and a collector plate connected to one side face of the group of electrode plates by a plurality of welding portions, wherein a positioning hole is formed on the edge portion of each of the electrode plates being connected to the collector plate, and in the connecting surface between the collector plate and the group of electrode plates, the welding portion is formed so that the welding portion is not aligned with the positioning hole.

When the collector plate is connected to the group of electrode plates by aligning the edge portions of each electrode plate precisely on the side face on which the group of electrode plates and the collector plate are connected, it is possible to improve the connection strength and the reliability of the connection between the group of the electrode plates and the collector plate. According to the fourth electrode plate unit, since each electrode plate is provided with positioning holes, by inserting the pins into the positioning holes, it is possible to align the edge portions of the electrode plates. As a result, it is possible to improve the connection strength and the reliability of the connection between the group of the electrode plates and the collector plate.

However, if the positioning holes are formed on the electrode plate, the strength of the portion on which the positioning holes are formed is smaller than that of the other places. Therefore, it is thought to tend to be deformed or fractured due to heat when the collector plate is welded. The deformation or fracture of the electrode plate may cause the deterioration of the connection strength and reliability of the connection. However, according to the fourth electrode plate unit, the welding portion is formed on the portion excluding the portion on which the positioning holes are formed, and it is possible to suppress the deterioration of the connecting strength and the reliability of the connection between the collector plate and the group of electrode plates.

It is preferable in the fourth electrode plate unit that each of the electrode plates comprises an electrode portion filled with an active material and a lead portion intervening between the electrode portion and the electrode collector plate, and the positioning holes are formed on the lead portion.

It is preferable in the fourth electrode plate unit that a plurality of positioning holes are formed on each of the positive electrode plate and the negative electrode plate, and at least one of the positioning holes has a circular shape and at least another of the positioning holes has an slot shape.

Furthermore, it is preferable in the third and fourth electrode plate unit that the welding portion is of a linear shape along the direction in which the plates are laminated. According to this preferable embodiment, the strength and the reliability of the connection between the collector plate and the group of electrode plates further can be improved.

Furthermore, it is preferable in the third and fourth electrode plate units that a brazing filler metal is disposed between the collector plate and the group of electrode plates in the welding portion. According to this preferable embodiment, since the brazing filler metal is melted at a relatively low temperature, the strength and the reliability of the connection between the collector plate and the group of electrode plates further can be improved.

Furthermore, the present invention provides a battery wherein the electrode plate unit of any of the first to fourth electrode plate units is housed in a battery case together with the electrolyte.

BRIEF DESCRIPTION OF THE DRAWINGS

FIG. 7A is a front view of an example of a collector plate, and FIG. 7B is a cross-sectional view thereof FIG. 8 is a perspective view showing a portion in which the collector plate is disposed in the electrode plate unit of the present invention.

FIG. 10A is a plan view showing an example of a battery of the present invention; thereof and FIG. 10B is a front view thereof.

FIG. 13 shows another embodiment of an electrode plate unit of the present invention.

DESCRIPTION OF THE PREFERRED EMBODIMENTS

Hereinafter, the present invention will be described by way of embodiments with reference to the accompanying drawings.

Embodiment 1

Figure 11:
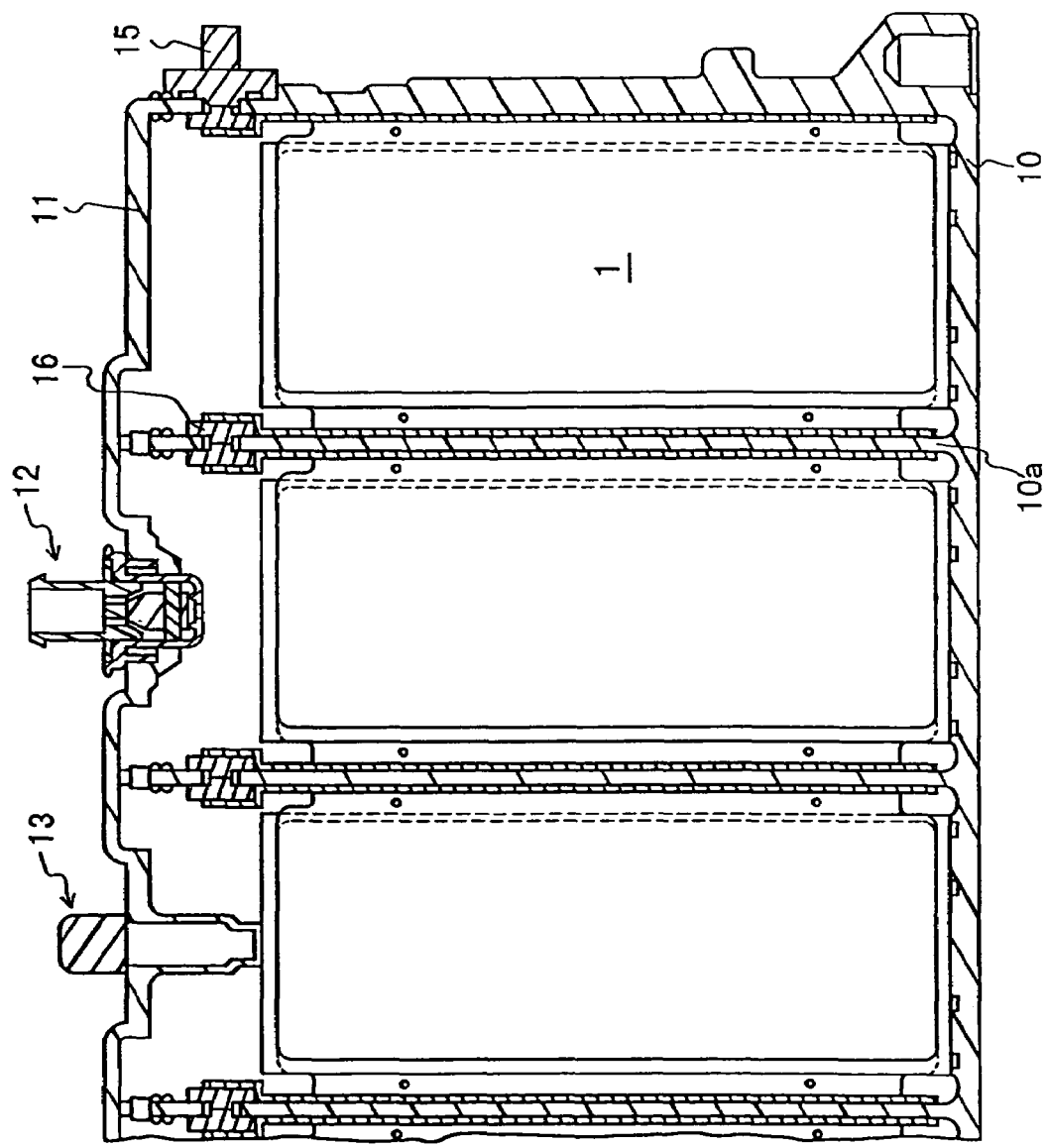
FIG. 11 is a cross-sectional view taken on line A-A of FIG. 10.

FIG. 10A is a plan view showing an example of a battery according to a first embodiment of the present invention, and FIG. 10B is a front view thereof. FIG. 11 is a cross-sectional view taken on line A-A of FIG. 10. This battery includes a battery case 10 and an electrode plate unit 1. The inside of the battery case 10 is divided into plurality of sections. The electrode plate unit 1 is housed in each of the above-mentioned sections of the battery case 10.

The electrode plate unit 1 includes a group of electrode plates in which a positive electrode plate, negative electrode plate and a separator are laminated and a positive electrode collector plate and a negative electrode collector plate that are connected to the group of electrode plates. The structure of the electrode plate unit 1 will be described in detail later.

In the battery, the electrode plate units 1 housed in the battery case 10 are electrically connected to each other. The electric connection between the electrode plate units 1 can be achieved, for example, by providing through holes on a separation wall 10a that divides the inside of the battery case 10 into sections; attaching a connection metal fitting 16 to the though holes; and connecting the positive electrode collector plate and the neighboring negative electrode collector plate of the electrode plate units 1 through the separation wall 10a with the connection metal fittings 16, respectively.

Furthermore, the positive electrode collector plate of the electrode plate unit housed in the section placed in one end portion of the battery case 10 is connected to a positive external terminal 14. Furthermore, the negative electrode collector plate of the electrode plate unit housed in the section placed on another end portion is connected to a negative external terminal 15.

In the battery case 10, electrolyte also is contained together with the electrode plate unit 1. There is no particular limitation to the kinds of electrolytes and appropriate electrolytes can be selected in accordance with the desired battery. For example, for nickel-metal-hydride batteries, aqueous solutions of potassium hydroxide, sodium hydroxide, lithium hydroxide, and the like can be used.

The battery case 10 is closed by a lid 11. The lid 11 is provided with a safety valve 12 operating in accordance with the pressure within the battery case 10. Furthermore, the lid 11 may be provided with an attachment portion 13 for which a sensor for detecting a battery temperature is attached. Furthermore, on the outer surface of the battery case 10, a rib 10b may be provided in order to improve the heat radiation property in a case where a plurality of batteries are integrated.

Figure 1:
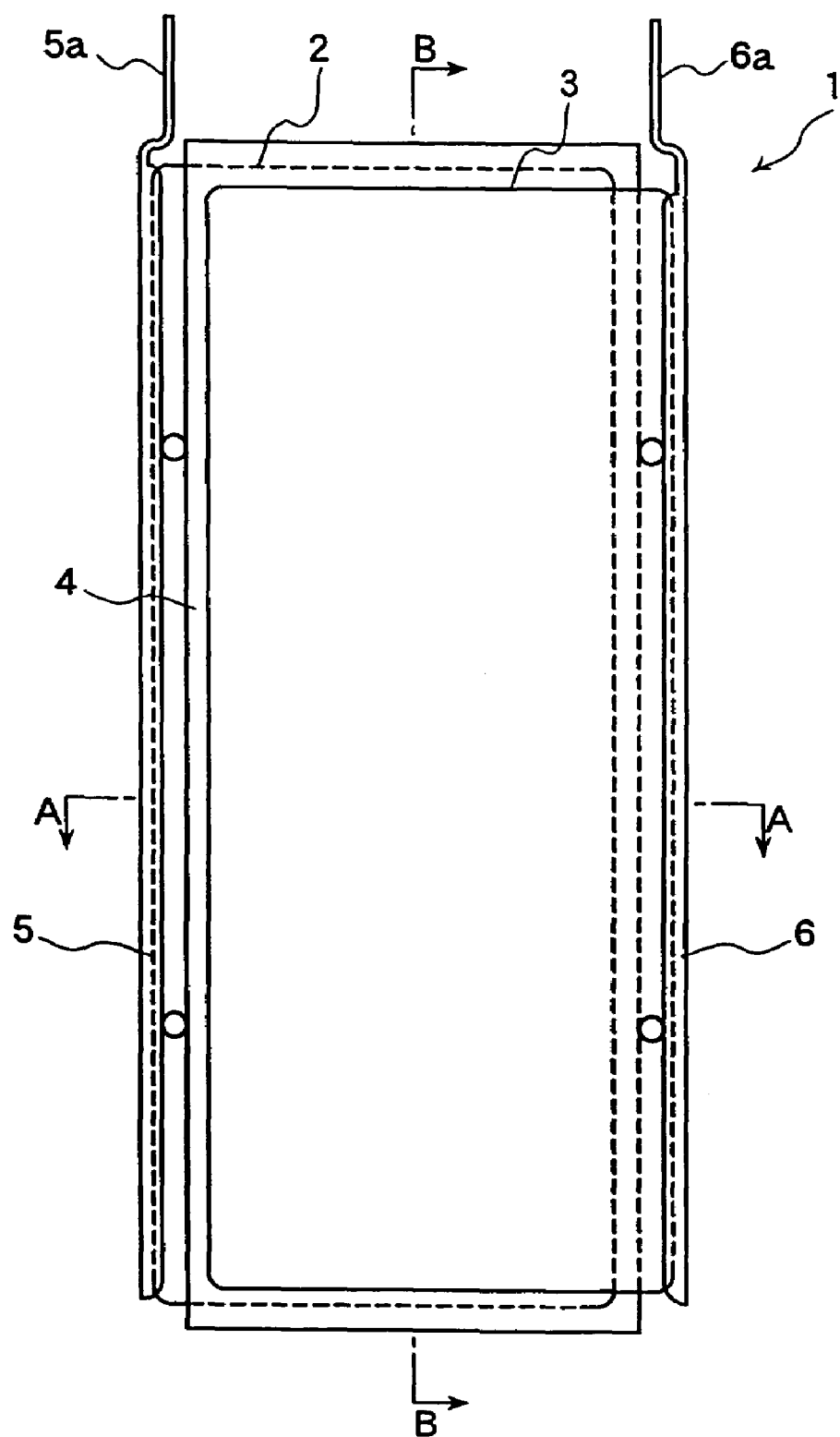
FIG. 1 is a front view showing an example of an electrode plate unit of the present invention.
Figure 2:
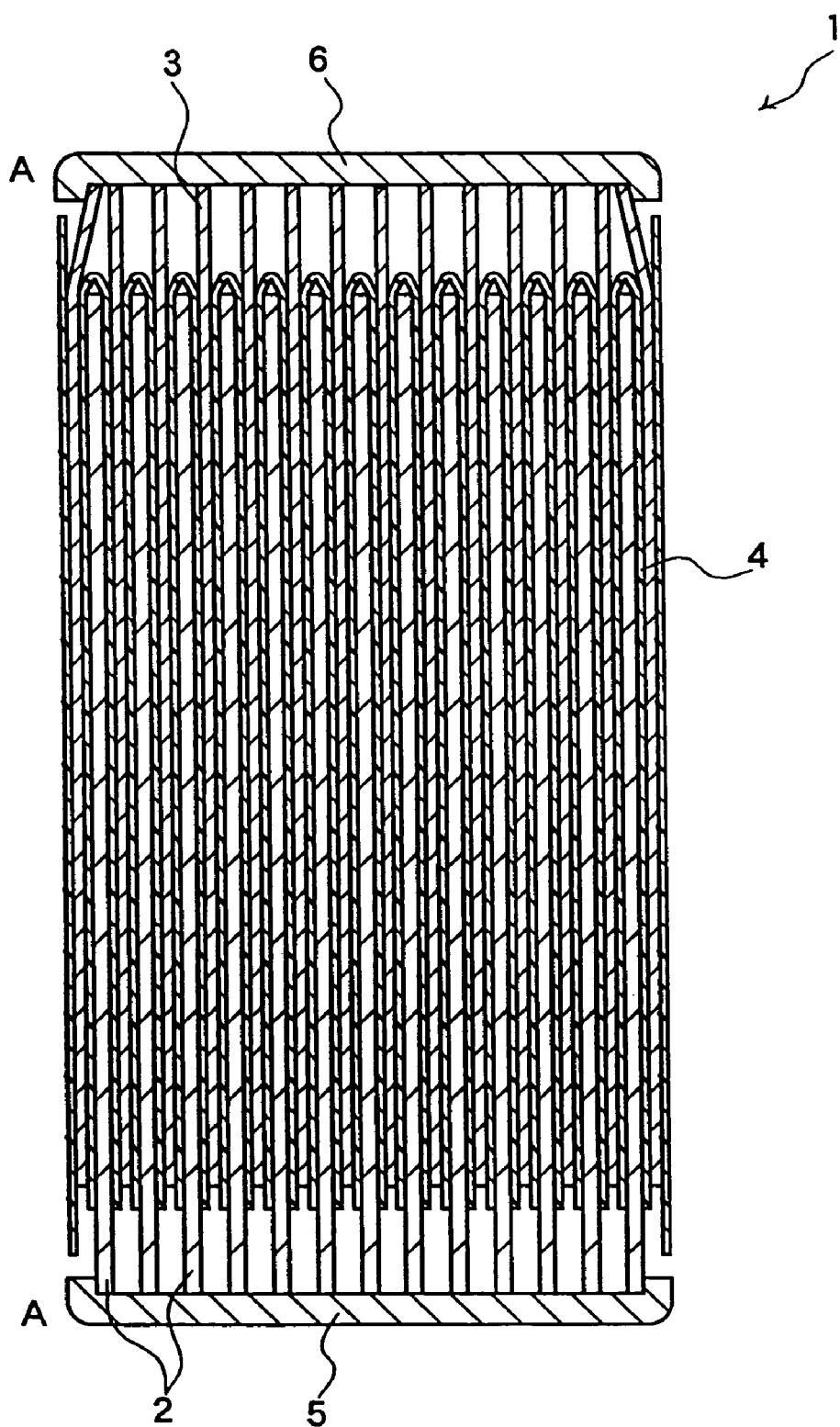
FIG. 2 is a cross-sectional view taken on line A-A of FIG. 1.
Figure 3:
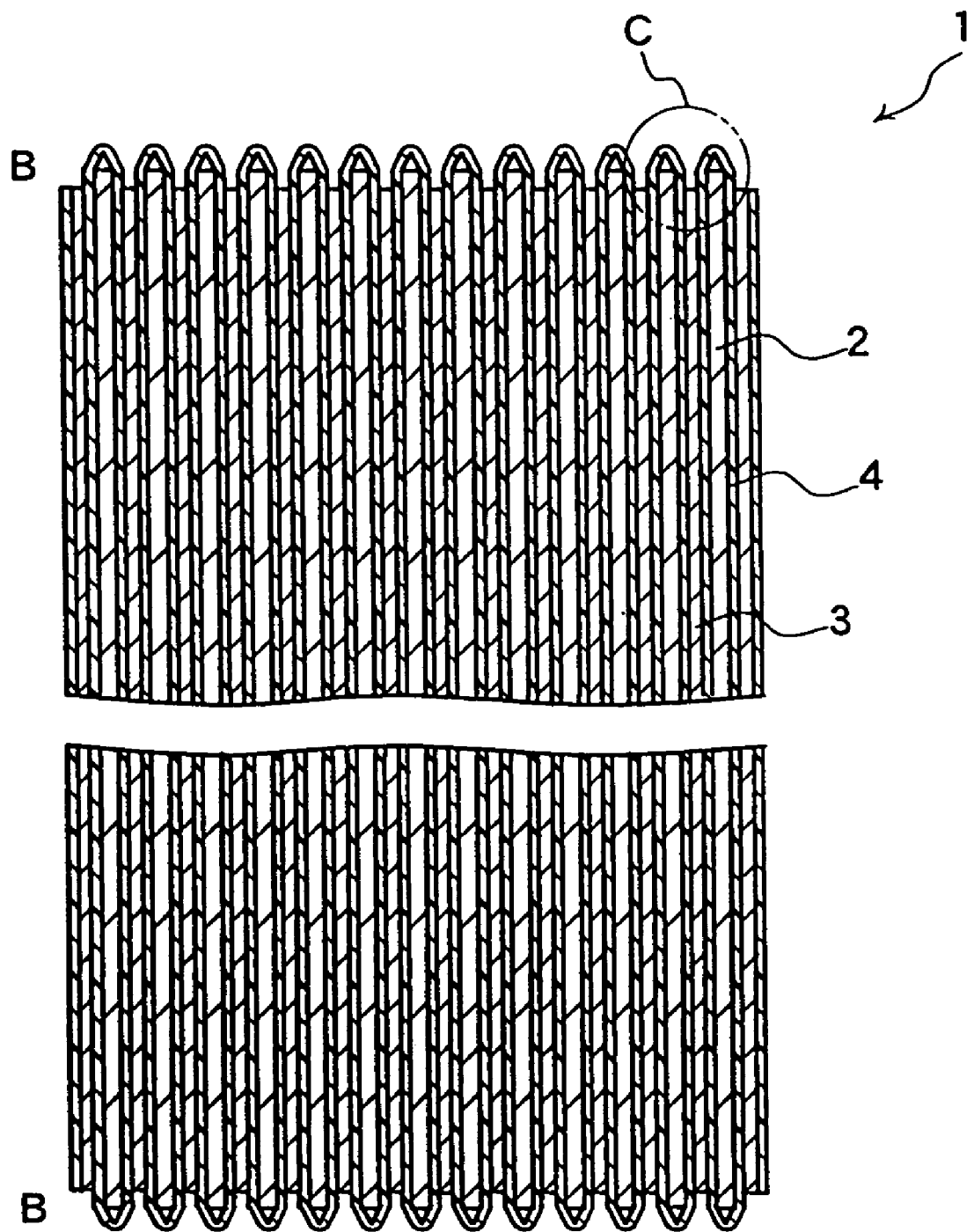
FIG. 3 is a cross-sectional view taken on line B-B of FIG. 1.

FIG. 1 is a front view showing an example of the electrode plate unit. FIG. 2 is a cross-sectional view taken on line A-A of FIG. 1; and FIG. 3 is a cross-sectional view taken on line B-B of FIG. 1.

This electrode plate unit 1 includes a group of electrode plates in which a positive electrode plate 2, a negative electrode plate 3 and a separator 4 are laminated and a positive electrode collector plate 5 and a negative electrode collector plate 6 are connected to the group of electrode plates.

Figure 5B:
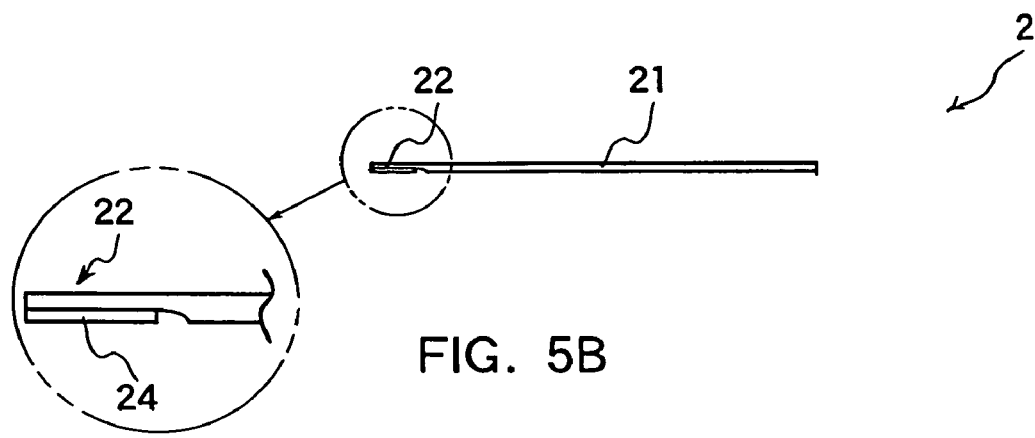
FIG. 5B is a plan view thereof.
Figure 5A:
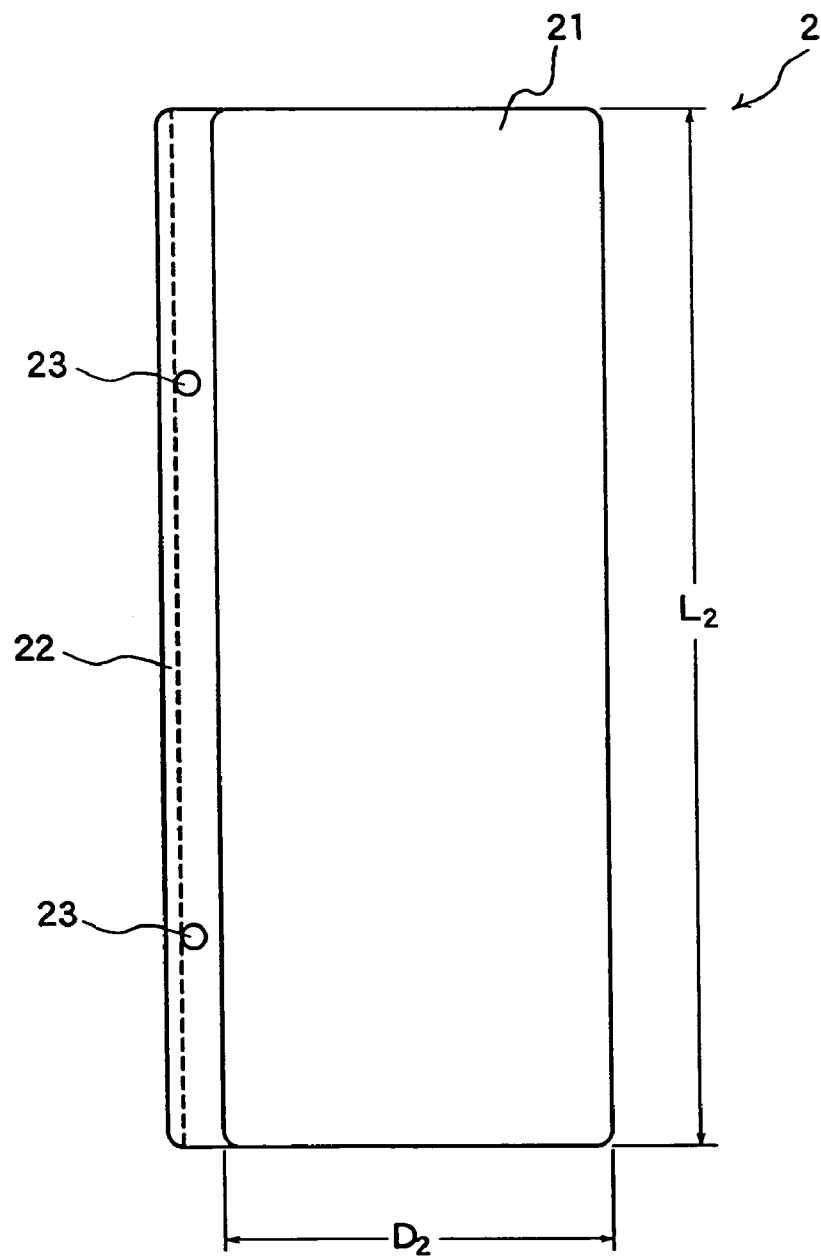
FIG. 5A is a front view of an example of a positive electrode plate.

FIG. 5A is a front view showing an example of the positive electrode plate 2, and FIG. 5B is a plan view thereof. The positive electrode plate 2 has a structure in which an electrode portion 21 that is filled with an active material and a lead portion 22 that is not filled with an active material are formed on a substrate. Furthermore, it is preferable that a reinforcing plate 24 is laminated on the lead portion 22.

A material forming the positive electrode 2 is not particularly limited, and it appropriately is decided in accordance with the kinds of batteries. For example, in the case of an electrode plate unit forming nickel-metal-hydride secondary batteries, a foam nickel substrate or a nickel fibrous substrate is used as the substrate, and nickel hydroxide is used as the active material.

Figure 6B:
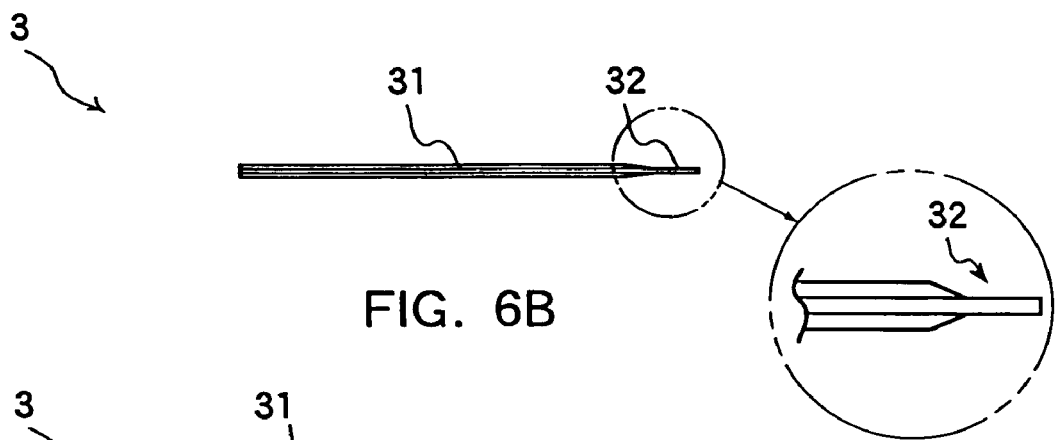
FIG. 6B is a plan view thereof.
Figure 6A:
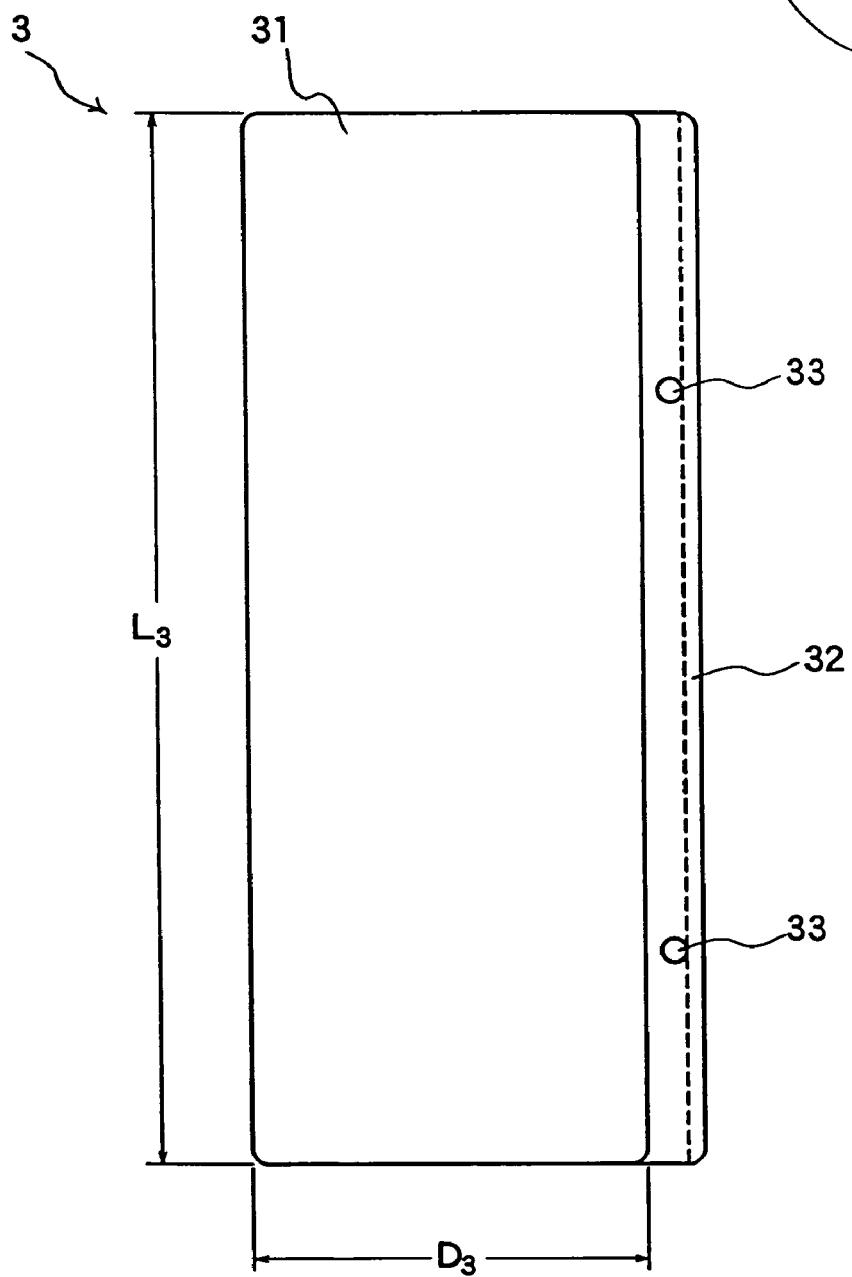
FIG. 6A is a front view of an example of a negative electrode plate.

FIG. 6A is front view showing an example of the negative electrode plate 3, and FIG. 6B is a plan view thereof. The negative electrode plate 3 has a structure in which an electrode portion 31 that is filled with an active material and a lead portion 32 that is not filled with an active material are formed on a substrate.

Also a material forming the negative electrode 3 is not particularly limited, and it appropriately is determined in accordance with the kinds of batteries. For example, in the case of an electrode plate unit forming a nickel-metal-hydride secondary battery, a pierced nickel plate is used as the substrate, and the $AB_5$ type or $AB_2$ type hydrogen absorbing alloy (wherein A denotes a typical metal element and B denotes a transition metal element) is used.

As shown in FIGS. 5 and 6, each electrode plate may have a rectangular shape as a whole with one edge portion of one side provided with a lead portion. At this time, it is preferable that the length (L2, L3) of the sides provided with the lead portion of the electrode plate are longer than the length (D2, D3) of the sides perpendicular thereto.

Furthermore, the length (L2) of the side of the positive electrode plate 2 provided with a lead portion 22 is longer than the length (L3) of the side of the negative electrode plate 3 provided with a lead portion 32.

It is preferable that positioning holes 23 and 33 are formed on the lead portions 22 and 32 of each electrode plate, respectively. The positioning holes of each electrode plate are placed so that the positioning holes that are formed on the electrode plates having the same polarity are overlapped, when the electrode plates are assembled into the group of electrode plates.

As shown in FIG. 1, the positive electrode plate 2 and the negative electrode plate 3 are laminated alternately via the separators 4 so that both electrode portions are allowed to be overlapped. Thus, the group of electrode plates is produced.

It is possible that the separator 4 envelops at least one electrode plate with the lead portion exposed. For example, a plurality of bag type products are used as separators 4, and the positive electrode plate 2 and/or the negative electrode plate 3 may be enveloped in the bag type product each by each. Furthermore, a zig-zag folded belt type product may be used as a separator 4 and one electrode plate may be inserted into the folded planes each by each. Moreover, a material of the separator 4 is not particularly limited. For example, a porous film, a non-woven fabric, woven fabric and the like can be used.

As shown in FIGS. 1 and 2, in the group of electrode plates, in one side face, the lead portion of the positive electrode plate 2 is protruded from the edge portion of the negative electrode plate 3. The positive electrode collector plate 5 is connected to this side face. Furthermore, on another side face, the lead portion of the negative electrode plate 3 is protruded from the edge portion of the positive electrode plate 2. The negative electrode collector plate 6 is connected to this side face. Thus, the electrode plate unit 1 is produced.

Figure 4:
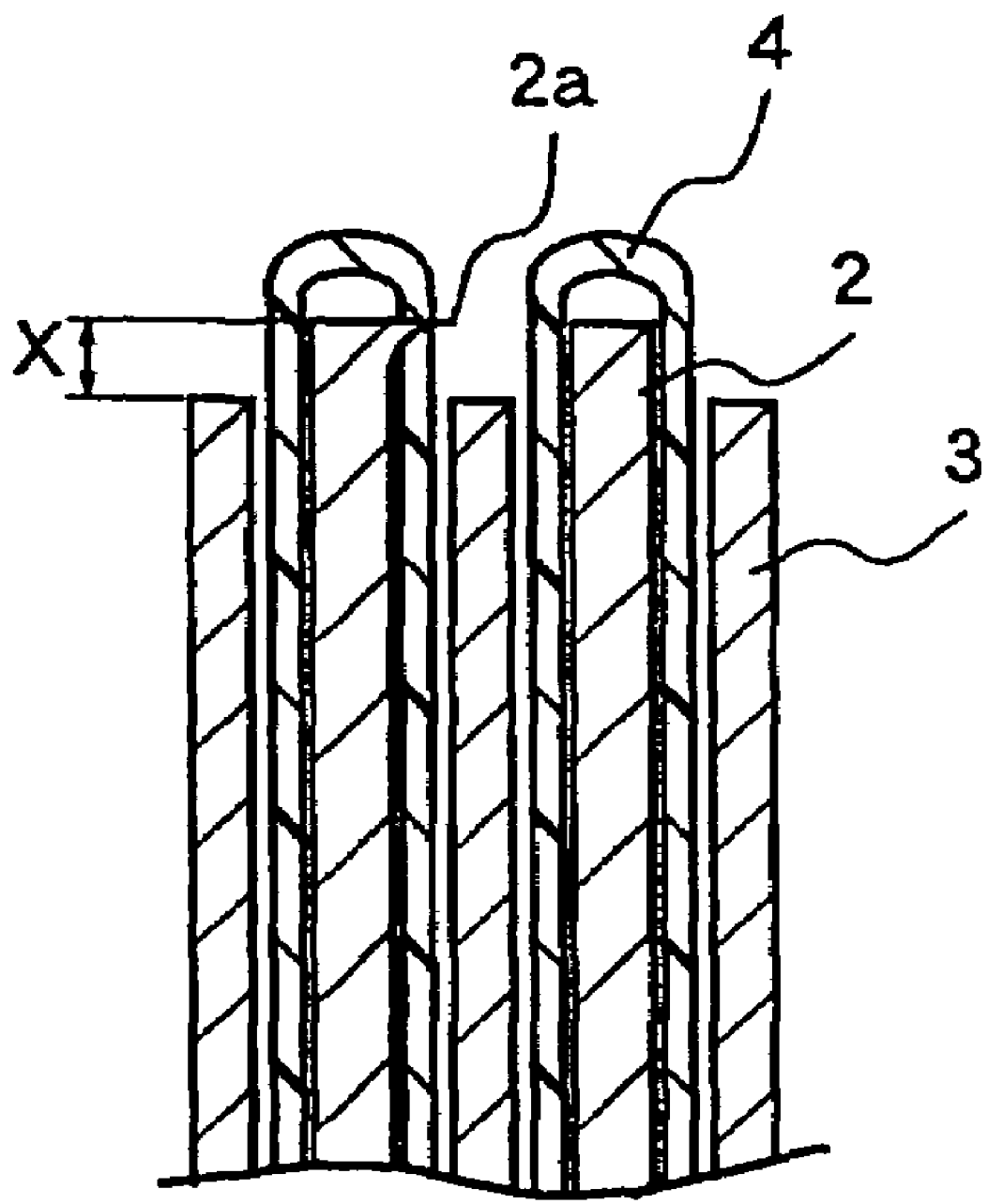
FIG. 4 is an enlarged cross-sectional view of a portion shown by C in FIG. 3.

Furthermore, as shown in FIGS. 1 and 3, in the electrode plate unit 1, on a side face of the group of electrode plates, to which the collector plates are not connected, the edge portion of the positive electrode plate 2 is protruded from the edge portion of the negative electrode plate 3. Therefore, as shown in FIG. 4, even if a flashing 2a is formed on the edge portion of the positive electrode plate 2, since the flashing 2a is not brought into contact with the negative electrode plate 3, it is possible to suppress the occurrence of short circuits between the positive and negative electrodes. FIG. 4 is an enlarged view of a part shown by C in FIG. 3.

The length (X in FIG. 4) of the portion of the positive electrode plate 2 that is protruded from the negative electrode plate 3 is not particularly limited, and the length may be, for example, 0.3 mm to 2 mm.

Figure 9:
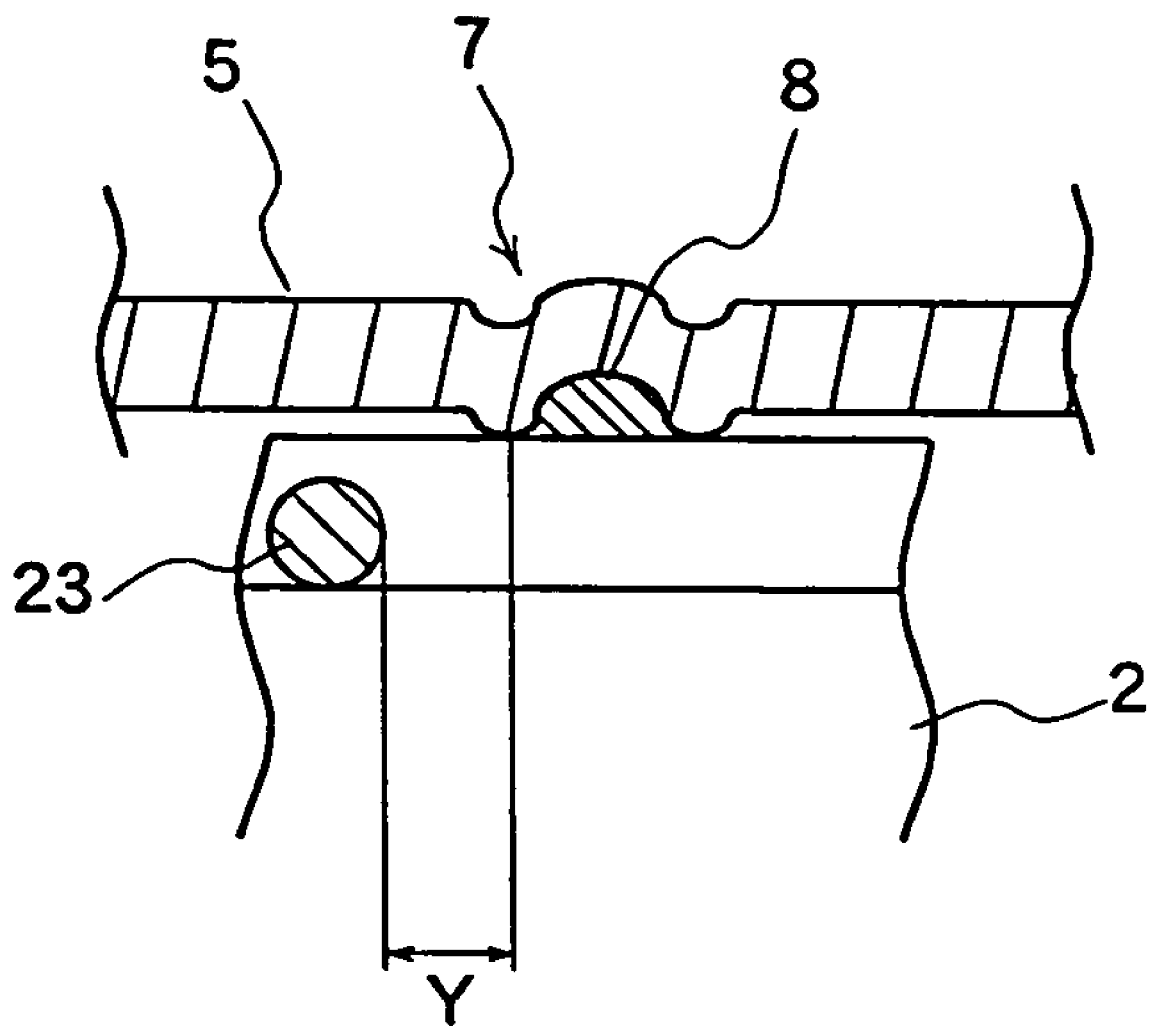
FIG. 9 is a cross sectional view taken on line A-A of FIG. 8.

As shown in FIGS. 1 and 2, both collector electrodes 5 and 6 are a plate covering at least one part of the side face of the group of the electrode plates. FIG. 7A is a front view showing an example of the positive electrode collector plate 5, and FIG. 7B is a plan view thereof. Furthermore, FIG. 8 is a perspective view showing a configuration in which the positive electrode collector plate 5 is connected to the electrode plates. FIG. 9 is a cross sectional view taken on line A-A of FIG. 8. FIGS. 7 to 9 and the explanation below relate to the configuration of the connection between of the positive electrode collector plate 5 and the group of electrode plates. However, the same is true in the configuration of the connection between the negative electrode collector plate 6 and the group of electrode plates.

A plurality of welding portions 7 are formed on the connection portion between the positive electrode collector plate 5 and the group of electrode plates. In this embodiment, there is no particular limitation about the intervals between the welding portions 7. As will be described in a second embodiment, it is preferable that the intervals between welding portions 7 are changed depending upon the density of electric current collected by the collector plate. Moreover, as will be explained in a third embodiment, it is preferable that the welding portion 7 is formed in a portion excluding a portion provided with positioning holes.

Furthermore, it is preferable that the welding portion 7 has a linear shape along the direction in which the plates are laminated. Furthermore, it is preferable that a brazing filler metal 8 such as a nickel brazing filler is interposed between the positive electrode collector plate 5 and the group of electrode plates in each welding portion 7.

The electrode plate unit 1 can be produced by, for example, the following method.

First, a substrate for the positive electrode plates is produced by cutting out a foam nickel plate, and an electrode portion and a lead portion are formed on the produced substrate. The electrode portion can be produced by filling a region of the substrate, in which the electrode portion is formed, with the paste containing an active material, followed by drying thereof. Furthermore, the lead portion is formed by pressing and compressing the region of the substrate in which the lead portion is formed in the direction of the thickness, followed by connecting a reinforcing plate on the surface thereof. Furthermore, positioning holes are formed on the lead portion. Thus, the positive electrode plate is produced. A plurality of positive electrode plates are prepared, and each positive electrode is covered with a bag type separator with the lead portion exposed.

On the other hand, a substrate for the negative electrode plate is produced by cutting out a nickel plate, and an electrode portion and a lead portion are formed on the produced substrate. The electrode portion can be produced by making a plurality of holes in a region of the substrate in which the electrode portion is formed, and filling the holes with the paste containing an active material, followed by drying thereof. Furthermore, the lead portion requires no particular processes for formation. Furthermore, the lead portions are provided with the positioning holes, and thus the negative electrode is produced.

By laminating the positive electrode plates covered with the separators and the negative electrode plates, the group of electrode plates are produced. Then, positioning pins are inserted into the positioning holes of the positive electrode plates and the negative electrode plates, respectively. Thereby, the positioning of each electrode plate is carried out so that the lead portion of the positive electrode plate is protruded on one side face of the group of electrode plates, the lead portion of the negative electrode plate is protruded on another side face, and the edge portion of the positive electrode plate is protruded in the rest of the side faces. At the same time, the edge portion of each electrode plate is aligned in the side face of the group of electrode plates on which the lead portion is protruded.

Furthermore, it is preferable that a circular positioning hole and an slot positioning hole are formed on each electrode plate, and pins are inserted into both of the positioning holes. In this case, the slot positioning hole acts to prevent the rotation of the electrode plate. According to this preferable embodiment, the difference of the size and the position of the holes between the electrode plates are corrected and it is possible to carry out the positioning and the alignment of the edge portions efficiently.

The positive electrode collector plate is connected to the side face of the group of electrode plates on which the lead portion of the positive electrode is produced. The connection of the positive collector electrode is carried out by irradiating the positive electrode collector plate with an electron beam or a laser beam while pressing the positive electrode collector plate toward the side of the group of electrode plates.

Then, the positioning pins inserted into the positioning holes of the positive electrode plate are pulled out, and a negative electrode collector plate is connected to side face of the group of electrode plates on which the lead portion of the negative electrode is protruded. This process is carried out in the same manner as in the connection process of the positive electrode collector plate. Then, the positioning pins inserted into the positioning holes of the negative electrode plate are pulled out, and an electrode plate unit is completed. The positioning pins of the positive electrode plate may be pulled out together with the positioning for negative plate after the negative electrode collector plate is connected.

Second Embodiment

The battery according to the second embodiment of the present invention has the same structure as in the first embodiment except that welding portions are provided on the connection face between the group of electrode plates and the collector plate at the particular arrangement. The battery of this embodiment has a structure, for example, shown in FIGS. 10 and 11.

The electrode plate unit of this embodiment has, for example, a structure shown in FIGS. 1 to 4 and includes a group of electrode plates in which a positive electrode plate 2, a negative electrode plate 3 and a separator 4 are laminated, and a positive electrode collector plate 5 and a negative electrode collector plate 6.

The positive electrode plate 2 and the negative electrode plate 3 have a structure, for example, shown in FIGS. 5 and 6. Structures and materials of the electrode plates are the same as in the first embodiment. However, in this embodiment, the relationship between the length (L2) of the side of the positive electrode plate 2 and the length (L3) of the side of the negative electrode plate 2 is not particularly limited. However, as described in the first embodiment, it is preferable that L2 is longer than L3.

As shown in FIGS. 1 and 2, the group of electrode plates is produced by laminating the positive electrode plates 2 and the negative electrode plates 3 alternately via the separators 4. The lead portions of the positive electrode plates 2 are protruded from the edge portion of the negative electrode plates 3 on one side of the group of electrode plates, and the positive electrode collector plate 5 is connected to the protruded lead portions. Furthermore, the lead portions of the negative electrode plates 3 are protruded from the edge portions of the positive electrode plates 2 at another side of the group of electrode plates, and the negative electrode collector plate 6 is connected to the protruded lead portions. Furthermore, it is not particularly limited but preferable also in this embodiment that the positive electrode plates 2 protrude from the negative electrode plates 3 at a side face of the group of the electrode plates on which the collector plates are not connected as in the first embodiment.

As shown in FIGS. 1 and 2, the both electrode collector plates 5 and 6 are a plate product covering at least a part of the side face of the group of electrode plates, one end of which is protruded from the group of electrode plates. These protruding portions 5a and 6a function as the connection portions for electrically connecting the electrode plate unit to the other member composing battery (for example, in the battery shown in FIGS. 10 and 11, the external terminals 15 and 16 or the connection metal fittings 16).

As shown in FIG. 8, a plurality of welding portions 7 are formed on a connecting portion between the positive collector plate 5 and the group of electrode plate. The interval between the welding portions 7 is narrower in a region closer to the protruding portion 5a of the collector plate and broader in the region that is far away from the protruding portion 5a. In other words, the welding portions 7a are set so that the intervals between the welding portions 7a are narrower in the region in which the density of electric current collected by the collector plate is increased.

Furthermore, as in the first embodiment, it is preferable that the welding portion 7 has a linear shape along the direction in which the electrode plates are laminated. Furthermore, it is preferable that a brazing filler metal 8 such as a nickel brazing filler is interposed between the positive electrode collector plate 5 and the group of electrode plates in each welding portion 7.

FIGS. 7 to 9 and the explanation above relate to the configuration of the connection between the positive electrode collector plate 5 and the group of electrode plates. However, the same is true in the configuration of the connection between the negative electrode collector plate 6 and the group of electrode plates.

The electrode plate unit of this embodiment can be produced, for example, by the same method as in the first embodiment. In this case, in the process of connecting the collector plate to the group of electrode plates, the plurality of portions on the electrode collector plate at appropriate intervals are irradiated with an electron beam or laser. The interval between the portions to be irradiated is set to be narrower in the region closer to the protruding portion of the electrode collector plate and the broader in the region that is far away from the protruding portion. Thus, a plurality of welding portions are arranged as mentioned above.

Third Embodiment

The battery according to the third embodiment of the present invention has the same structure as in the first embodiment except that welding portions are provided on the connection face between the group of electrode plates and the collector plate except for particular portions. The battery of this embodiment has a structure, for example, shown in FIGS. 10 and 11.

The electrode plate unit of this embodiment has, for example, a structure shown in FIGS. 1 to 4 and includes a group of electrode plates in which a positive electrode plate 2, a negative electrode plate 3 and a separator 4 are laminated, and a positive electrode collector plate 5 and a negative electrode collector plate 6.

The positive electrode plate 2 and the negative electrode plate 3 have a structure, for example, shown in FIGS. 5 and 6. Structures and materials of the electrode plates are the same as in the second embodiment. However, in this embodiment, in the positive electrode plate 2 and the negative electrode plate 3, positioning holes 23 and 33 should be provided.

As shown in FIGS. 1 and 2, the group of electrode plates is produced by laminating the positive electrode plates 2 and the negative electrode plates 3 alternately via the separators 4. The lead portions of the positive electrode plates 2 are protruded from the edge portion of the negative electrode plates 3 on one side of the group of electrode plates, and the positive electrode collector plate 5 is connected to the protruded lead portions. Furthermore, the lead portions of the negative electrode plates 3 are protruded from the edge portion of the positive electrode plate 2 at another side of the group of electrode plates, and the negative electrode collector plate 6 is connected to the protruded lead portions. Furthermore, it is not particularly limited but preferable also in this embodiment that the positive electrode plates 2 protrude from the negative electrode plates 3 at a side face of the group of the electrode plates on which the collector plate are not connected as in the first embodiment.

As shown in FIGS. 1 and 2, both of the positive electrode collector plate 5 and the negative electrode collector 6 are a plate product covering at least a part of the side face of the group of the electrode plates with one end protruded from the group of electrode plates.

As shown in FIG. 8, a plurality of welding portions 7 are formed on the connecting portion between the positive collector plate 5 and the group of electrode plates. The welding portions 7 are formed in a region excluding the portion on which the positioning holes 23 are formed. In other words, as shown in FIGS. 8 and 9, the welding portion 7 is formed so that the positioning holes 23 are not located right under the welding portion 7.

A distance (Y) between the welding portion 7 and the positioning hole 23 is set to be, for example, 2 mm or more.

Furthermore, there is no particular limitation, however, as in the second embodiment, it is preferable that the intervals between the welding portions 7 are narrower in the region closer to the protruding portion 5a of the collector plate and broader in the region far away from the protruding portion 5a.

Furthermore, as in the first embodiment, it is preferable that the welding portion 7 has a linear shape along the direction in which the electrode plates are laminated. Furthermore, it is preferable that a brazing filler metal 8 such as a nickel brazing filler is interposed between the positive electrode collector plate 5 and the group of electrode plates in each welding portion 7.

FIGS. 7 to 9 and the explanation above relate to the configuration of the connection between of the positive electrode collector plate 5 and the group of electrode plates. However, the same is true in the configuration of the connection between the negative electrode collector plate 6 and the group of electrode plates.

The electrode plate unit of this embodiment can be produced, for example, by the same method as in the second embodiment. In this case, in the process of connecting the collector plate to the group of electrode plates, the portion excluding the portion right above the positioning portions is irradiated with an electron beam or a laser beam. Thus, a plurality of welding portions are formed on the portions mentioned above.

Fourth Embodiment

Figure 12:
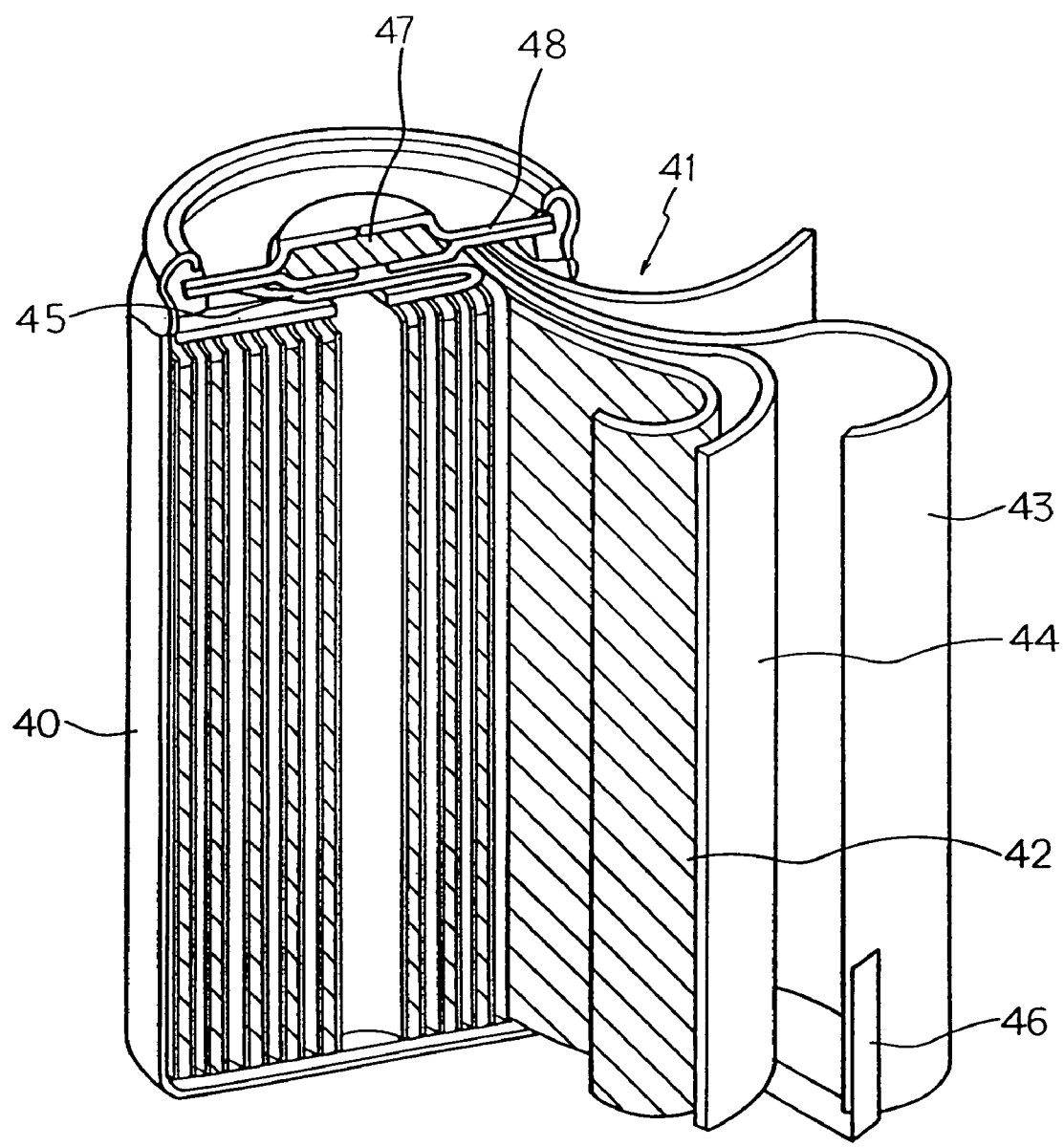
FIG. 12 is a partial cross-sectional view showing another example of the battery of a present invention.

FIG. 12 is a cross-sectional view showing an example of the battery according to the fourth embodiment of the present invention. This battery includes a cylindrical battery case 40 and the electrode plate unit 41 housed in the battery case 40.

The electrode plate unit 41 includes a positive electrode plate 42, a negative electrode plate 43 and a separator 44. The electrode plate unit 41 further includes a positive electrode lead 45 led out of the positive electrode plate 42 and a negative electrode lead 46 led out of the negative electrode plate 43. The structure of the electrode plate unit 41 will be described later.

The battery case 40 is closed with a lid 48 provided with a safety valve 47. The positive electrode lead 45 of the electrode plate unit is electrically connected to the lid 48 that functions also as a positive electrode terminal. The negative electrode lead 46 is electrically connected to the battery case 40 that functions also as a negative electrode terminal.

Furthermore, electrolyte together with the electrode plate unit 41 is housed within the battery case 40. The kinds of electrolyte are not particularly limited and, for example, the same material as in the first embodiment can be used.

Next, the structure of the electrode plate unit 41 will be explained. This electrode plate unit 41 has a structure in which the positive electrode 42, the negative electrode 43 and the separator 44 are laminated, and the laminate is rolled.

The positive electrode plate 42 and the negative electrode plate 43 are formed by filling a belt-like substrate with an active material. Furthermore, a substrate and an active material constituting each electrode are not particularly limited, and, for example, the same material as in the first embodiment can be used.

For example, the positive electrode plate 42 is produced by filling a substrate produced by cutting out a foam nickel plate with an active material. The cutting of the foam nickel plate may form flashing in the edge portion of the positive electrode plate. This flashing protrudes from the face of the foam nickel plate in the predetermined direction and the protruding direction is dependent upon the motion of a cutting blade with respect to the foam nickel plate at cutting.

In this embodiment, the longer side of the positive electrode plate 42 is set to be longer than the longer side of the negative electrode plate 43. The difference between both sides is, for example, 0.3 mm to 2 mm. As long as the difference is in this range, the specific size of each electrode plate is not particularly limited and the size is appropriately determined in accordance with the size of the battery.

The group of electrode plates is produced by laminating the positive electrode plate 42 and the negative electrode plate 43 via the separator 44. In the group of electrode plates, the positive electrode plate 42 and the negative electrode plate 43 are laminated so that if a flashing is generated on the end portion of the positive electrode plate 42, this flashing protrudes toward the negative electrode plate 43.

As a separator 44, the belt-like separator can be used. The size of the separator is not particularly limited. However, it is preferable that the longer side and shorter side of the separator are longer than the longer side and the shorter side of the positive electrode, respectively. Furthermore, as a material of the separator 44, for example, the same material as in the first embodiment can be used.

The group of electrode plates is rolled in a cylindrical shape along the longitudinal direction thereof. Furthermore, the positive lead 45 is led out of the positive electrode plate 42 and the negative lead 46 is led out of the negative electrode plate 43. Thus, the electrode plate unit 41 can be formed.

Figure 13A:
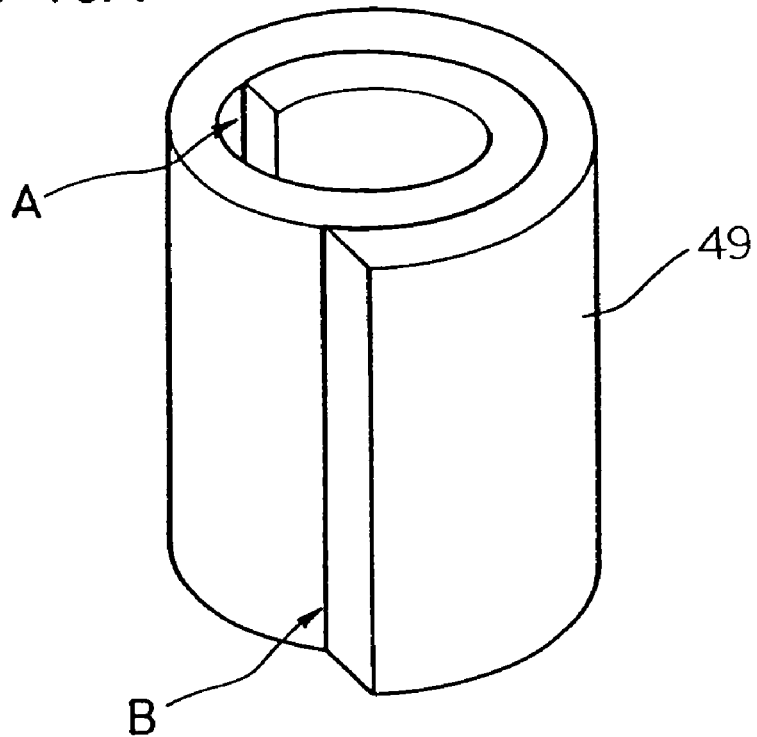
FIG. 13A is a schematic view.
Figure 13B:
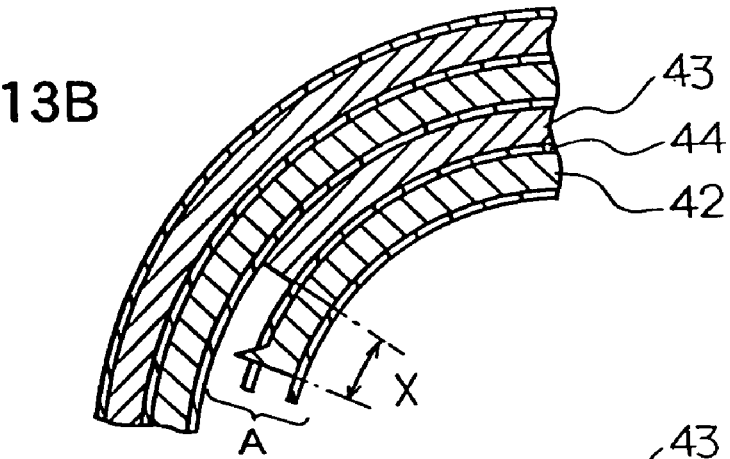
FIG. 13B is a cross-sectional view around the central portion.

FIG. 13A is a schematic view showing a structure of the electrode plate unit; FIG. 13B is a cross-sectional view showing a structure around the central portion of the electrode plate unit; and FIG. 13C is a cross-sectional view showing a structure around the outer-most portion.

Figure 13C:
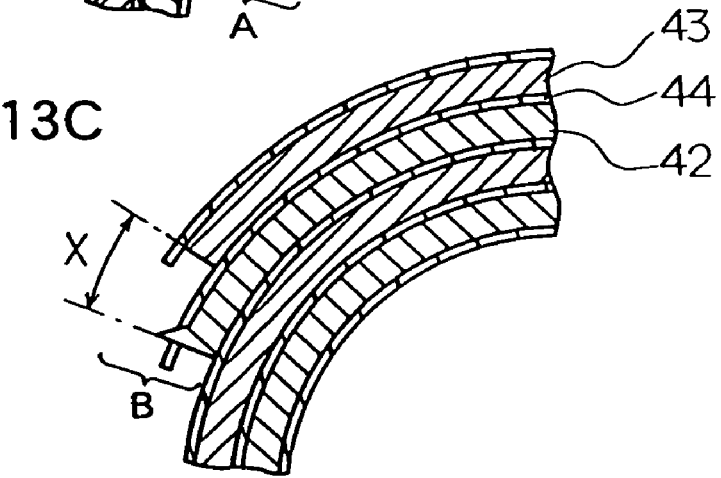
FIG. 13C is a cross-sectional view around the outer-most portion.
Figure 14:
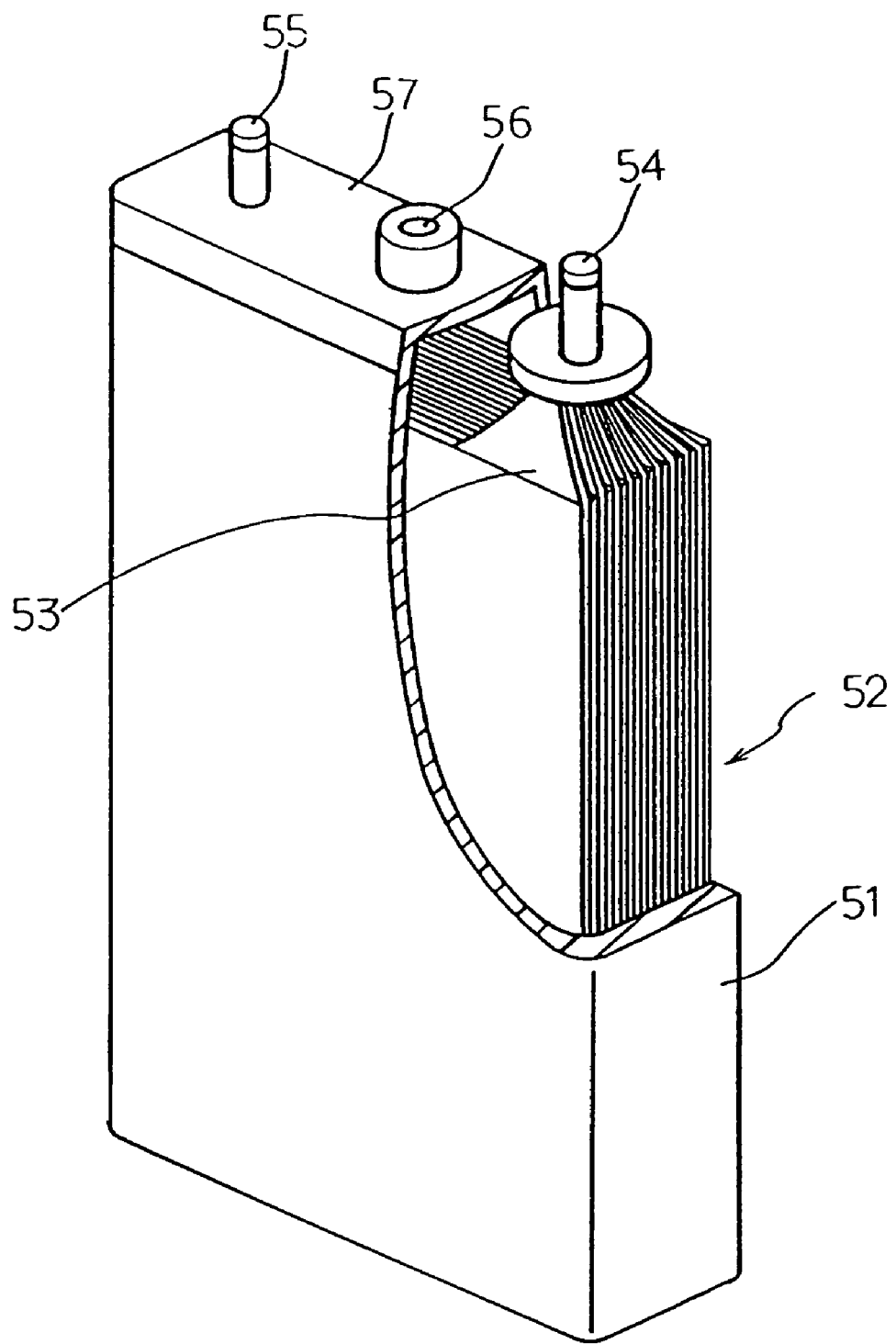
FIG. 14 is a perspective view showing a structure of a conventional battery, partially cut away.
Figure 15:
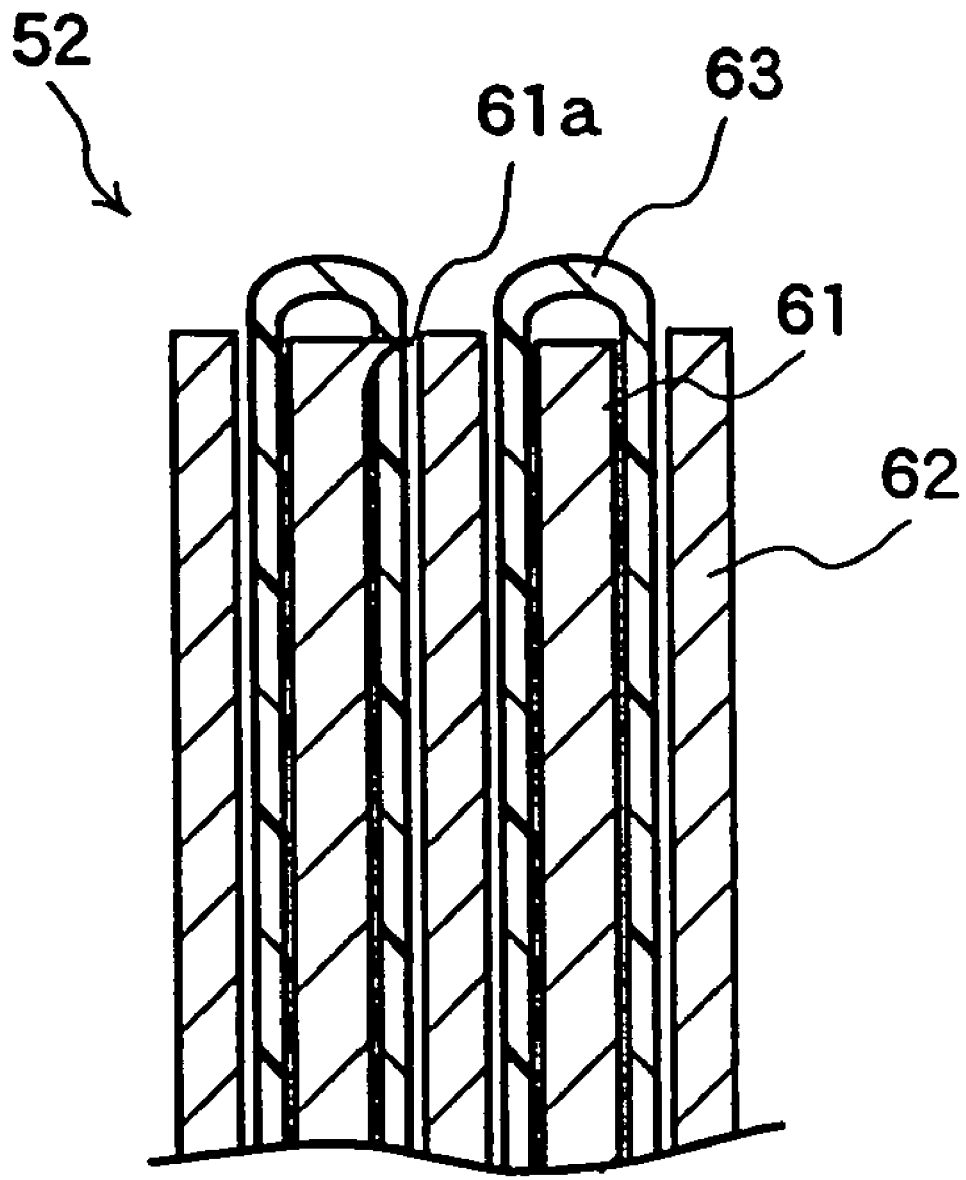
FIG. 15 is a cross-sectional view showing a group of electrode constituting a conventional battery.

As shown in FIGS. 13B and 13C, the edge portion of the positive electrode plate 42 is protruded from the negative electrode plate 43 in the side face of the short side of the group of electrode plates 49, that is, the side face (A) where the rolling is started and the side face (B) where the rolling is completed. The length (X in figure) of the portion in which the positive electrode plate 42 is protruded from the negative electrode plate 43 is not particularly limited, and the length may be, for example, 0.3 mm to 2 mm.

As shown in FIG. 13, in such an electrode plate unit 41, even if a flashing 42a occurs in the edge portion of the positive electrode plate 42, since the flashing 42a is not brought into contact with the negative electrode 43, short circuit between positive and negative electrodes can be suppressed.

Moreover, it is preferable in the electrode plate unit 41 that the edge portion of the positive electrode plate 12 is protruded from the edge portion of the negative electrode plate 13 also in the side face of the longer side of the electrode group.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An electrode plate unit comprising
a group of electrode plates in which a plurality of positive electrode plates and a plurality of negative electrode plates are laminated alternately via separators, and
a collector plate connected to one side face of the group of electrode plates by a plurality of welding portions,
wherein an interval between the welding portions connecting the collector plate and the group of electrode plates is set to be narrower in a region in which the density of electric current collected by the collector plate is higher.

2. The electrode plate unit according to claim 1, wherein the collector plate is disposed with one end portion protruded from the group of electrode plates, and the welding portion is formed so that the intervals between the welding portions are narrower in a region closer to the end portion of the collector plate being protruded from the group of the electrode plates.

3. The electrode plate unit according to claim 1, wherein the welding portions have a linear shape along the direction in which the electrode plates are laminated.

4. The electrode plate unit according to claim 1, wherein a brazing filler metal is disposed between the collector plate and the group of electrode plates in the welding portions.

* * * * *